United States Patent [19]
Crippen

[11] Patent Number: 5,241,812
[45] Date of Patent: Sep. 7, 1993

[54] RAKE TINE CONSTRUCTION

[76] Inventor: Richard P. Crippen, 10359 Wildwood Rd., Bloomington, Minn. 55437-2297

[21] Appl. No.: 733,467

[22] Filed: Jul. 22, 1991

[51] Int. Cl.$^5$ ............................................. A01D 7/06
[52] U.S. Cl. .............................. 56/400.21; 56/400.05
[58] Field of Search ............ 56/400.04, 400.05, 400.06, 56/400.07, 400.16, 400.17, 400.19, 400.2, 400.21

[56] References Cited

U.S. PATENT DOCUMENTS

| D. 51,327 | 10/1917 | Bredle | D8/13 |
| 2,163,421 | 6/1939 | Caramanico | 56/400.17 |

FOREIGN PATENT DOCUMENTS 2158332 11/1985 United Kingdom ............. 56/400.16

Primary Examiner—Terry Lee Melius
Attorney, Agent, or Firm—John W. Adams

[57] ABSTRACT

A spring tine rake having a plurality of raking tines formed from a flat resilient material with the upper portions thereof mounted in fixed relation on a handle and having a 90 degree twist therein to orient the lower blade portions of the tines in an upstanding plane generally parallel to the direction of the raking action.

2 Claims, 1 Drawing Sheet

RAKE TINE CONSTRUCTION

BACKGROUND

A number of spring hand rakes have been developed over the years. However, none of these have been very effective for removing thatch and matted debris from a lawn. The tines of the rake are conventionally oriented so that the ground engaging blade portion is oriented transversely of the direction of travel during the raking operation. This cross orientation of the blades not only produces considerable resistance to penetration into the accumulated thatch at the base of the blades of grass but also tends to damage the healthy grass when pressure is applied in an attempt to remove the thatch and matted debris. The present invention is designed to overcome these problems.

SUMMARY OF THE INVENTION

The present invention is specifically designed to provide a spring tine rake, usually hand operated, which permits a deeper penetration into the ground of a lawn than conventional rakes. By orienting the ground engaging portion of the spring tine elements so that the blade of each tine element is substantially parallel to the direction of the raking operation, the blades will penetrate into the matted thatch which accumulates at the base of the blades of grass. This readily removes the thatch without damaging the grass. The spring upper portions of each of the tines limits the actual force exerted by the blades by providing yieldability of each elongated spring tine element. Rigidly mounted cultivator tines have been used in the past such as shown in the U.S. Pat. No. Des. 51,327 issued to J. D. Brevele on Oct. 9, 1917. This patent is the most pertinent reference known to applicant at this time. Such a rigid tine construction as provided in Brevele would tear out the blades of grass as it is designed to do in cultivating around plants in a garden and therefore would be inoperable as a lawn rake. In other words, the rigid tine construction would be totally unsatisfactory for use in a raking operation of a lawn. The present invention can be readily manufactured by twisting the lower steel blades of a spring steel rake construction as specifically illustrated in the drawings and described in detail herein.

DETAILED DESCRIPTION OF THE PREFERRED EMBODIMENT

Figure 1:
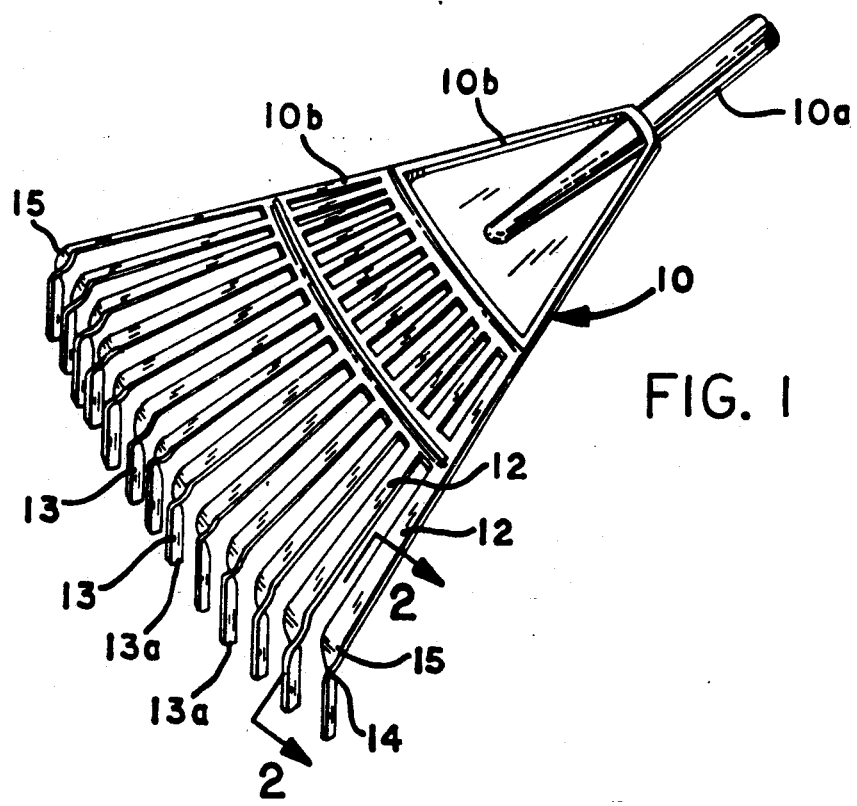
FIG. 1 is a perspective view showing a rake embodying this invention.
Figure 2:
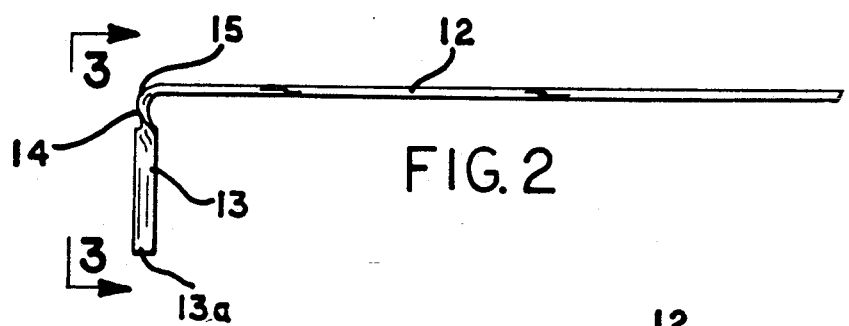
FIG. 2 is a side elevation view of one of the spring tine elements as viewed along the line 2—2 of FIG. 1, and, FIG. 3 is a front elevational view of one of the tines as viewed along the line 3—3 of FIG. 2.
Figure 3:
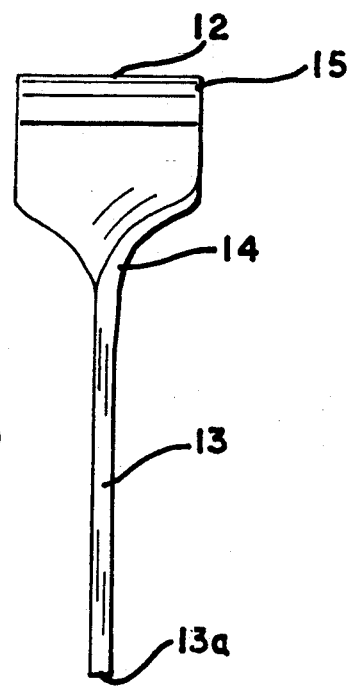

A spring tine rake 10 is illustrated in FIG. 1 which embodies this invention. The rake handle 10a is illustrated with a mounting head 10b securely attached thereto.

A plurality of spring tine elements 12 are securely anchored at their upper ends to mounting head 10b in a manner to provide an independent mounting for each of the tines extending from the mounting head 10b. Each of the tines 12 in the form illustrated is approximately 12 inches long and is made from suitable resilient material such as flat spring steel approximately ¼ inch wide and 1/32 inch thick.

A lower ground engaging blade element 13 is provided at the end of each of the tines 12 as by providing a 90 degree twist 14 in each tine in spaced relation above the respective ends 13a of the blade elements 13. In the form shown this twist 14 is provided immediately below the bend 15 in each of the tine elements 12.

It will be apparent that the upper portion of each of the spring tines 12 provides a spring support for each of the blade elements 13. This resilient mounting of each blade permits the ends 13a to follow irregularities in the ground surface without gouging the ground and ripping out the blades of grass which would be a problem if the blades were rigidly mounted on the mounting head 10b.

What is claimed is:

1. A rake construction comprising:
   an elongated handle,
   a tine mounting head fixed at the lower end of the rake handle,
   a plurality of spring tine elements securely anchored at their upper ends to the mounting head and supported therefrom in a manner to provide a plurality of spaced-apart supporting arm portions,
   a plurality of lower blade ground engaging elements respectively mounted on the lower end portions of the spring tine elements and formed from generally flat material each lying in a plane generally parallel to the direction of the raking operation to permit penetration of the lower ends of the tine elements into the ground surface without damaging the grass roots while removing the accumulation of leaves and thatch on said ground surface,
   wherein each tine element is formed from a strip of flat resilient material having a greater width than its thickness to provide a wider flat side and a narrower edge side and is oriented so that the flat side of each resilient upper supporting arm portion lies substantially in a plane defined by the spaced-apart upper tine elements, and
   the lower ground engaging blade elements respectively lying in generally parallel planes disposed normal to the plane defined by the upper flat portions of the tines.

2. The structure set forth in claim 1 wherein the tines are made from bendable material to permit the lower blade portions to be formed by twisting the lower portions of each tine element to produce the desired orientation.

* * * * *